(12) United States Patent
Pattenden

(10) Patent No.: US 8,600,310 B2
(45) Date of Patent: Dec. 3, 2013

(54) MULTIMEDIA PLAYBACK CALIBRATION METHODS, DEVICES AND SYSTEMS

(71) Applicant: Research In Motion Limited, Waterloo (CA)

(72) Inventor: Christopher Pattenden, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/664,800

(22) Filed: Oct. 31, 2012

(65) Prior Publication Data

US 2013/0060883 A1 Mar. 7, 2013

Related U.S. Application Data

(63) Continuation of application No. 12/775,055, filed on May 6, 2010, now Pat. No. 8,311,487.

(51) Int. Cl.
*H04B 17/00* (2006.01)

(52) U.S. Cl.
USPC ............... 455/67.11; 455/63.1; 455/226.1

(58) Field of Classification Search
USPC ................ 455/41.2, 63.1, 67.11, 226.1
See application file for complete search history.

(56) References Cited

U.S. PATENT DOCUMENTS

| | | | |
|---|---|---|---|
| 6,115,476 A * | 9/2000 | O'Conner et al. | ............ 381/103 |
| 2002/0146136 A1 | 10/2002 | Carter, Jr. | |
| 2005/0282580 A1 | 12/2005 | Tuori et al. | |
| 2008/0287166 A1 | 11/2008 | Lin | |
| 2009/0060446 A1 * | 3/2009 | Holden et al. | ............ 386/46 |

FOREIGN PATENT DOCUMENTS

EP 1503567 2/2005

OTHER PUBLICATIONS

Liem Ly, "Bluetooth 101+" (slide presentation), Cambridge Silicon Radio, Sep. 26, 2006, Dallas Texas.
Unknown Author, "Compensation (engineering)", article, http://en.wikipedia.org/wiki/Compenstion_(engineering), viewed on Nov. 30, 2010.
European Search Report in respect of Application No. 10162222.3, dated Oct. 19, 2010.
Office Action mailed Aug. 20, 2013 in Canadian application No. 2,739,104.

\* cited by examiner

*Primary Examiner* — Tuan H Nguyen
(74) *Attorney, Agent, or Firm* — Ridout & Maybee LLP

(57) ABSTRACT

A multimedia playback calibration method includes a calibration module operating on a mobile communications device to cause it to: introduce test data at a first end, in the mobile device, of a playback path and receive data, played back by a playback device at a second end of the playback path, at a sensor integral to the mobile device; compare the received data against the test data to determine a characteristic of the playback path; and configure the mobile device to compensate for this characteristic. The mobile device may comprise a handheld casing enclosing a central processing unit, a multimedia player module for initiating playback of at least one data stream on a playback device, communication capability for forwarding the at least one data stream from the mobile device to the playback device along a playback path and the calibration module.

17 Claims, 8 Drawing Sheets

MULTIMEDIA PLAYBACK CALIBRATION METHODS, DEVICES AND SYSTEMS

This application is a continuation of U.S. patent application Ser. No. 12/775,055, entitled "MULTIMEDIA PLAYBACK CALIBRATION METHODS, DEVICES AND SYSTEMS" filed on May 6, 2010, which issued as U.S. Pat. No. 8,311,487 on Nov. 13, 2012 and which is incorporated herein by reference.

TECHNICAL FIELD

The present disclosure relates to multimedia playback and more particularly, to a method, system and mobile device for calibrating playback of multimedia data streams.

INTRODUCTION

Modern mobile communication devices are equipped with many sophisticated features including multimedia players and various built-in or external peripheral communications devices. Playback of audio and video data streams using such players and devices may take on an increasing number of configurations ranging from playback directly on a display on the mobile device itself with audio provided through a built-in speaker or a wired earphone to wireless communications of the video stream to large display monitors and of the audio stream to multi-channel speaker systems.

The wide variety of available configurations may involve significantly different data processing paths between data streams resulting in inefficient calibration of the playback path, including loss of synchronization between complementary data streams, which may in some circumstances be perceptible to a user of a mobile communication device.

Improvements in calibration methods and apparata for use by the mobile devices are desirable.

BRIEF DESCRIPTION OF THE DRAWINGS

Like reference numerals are used in the drawings to denote like elements and features.

DESCRIPTION

Figure 1:
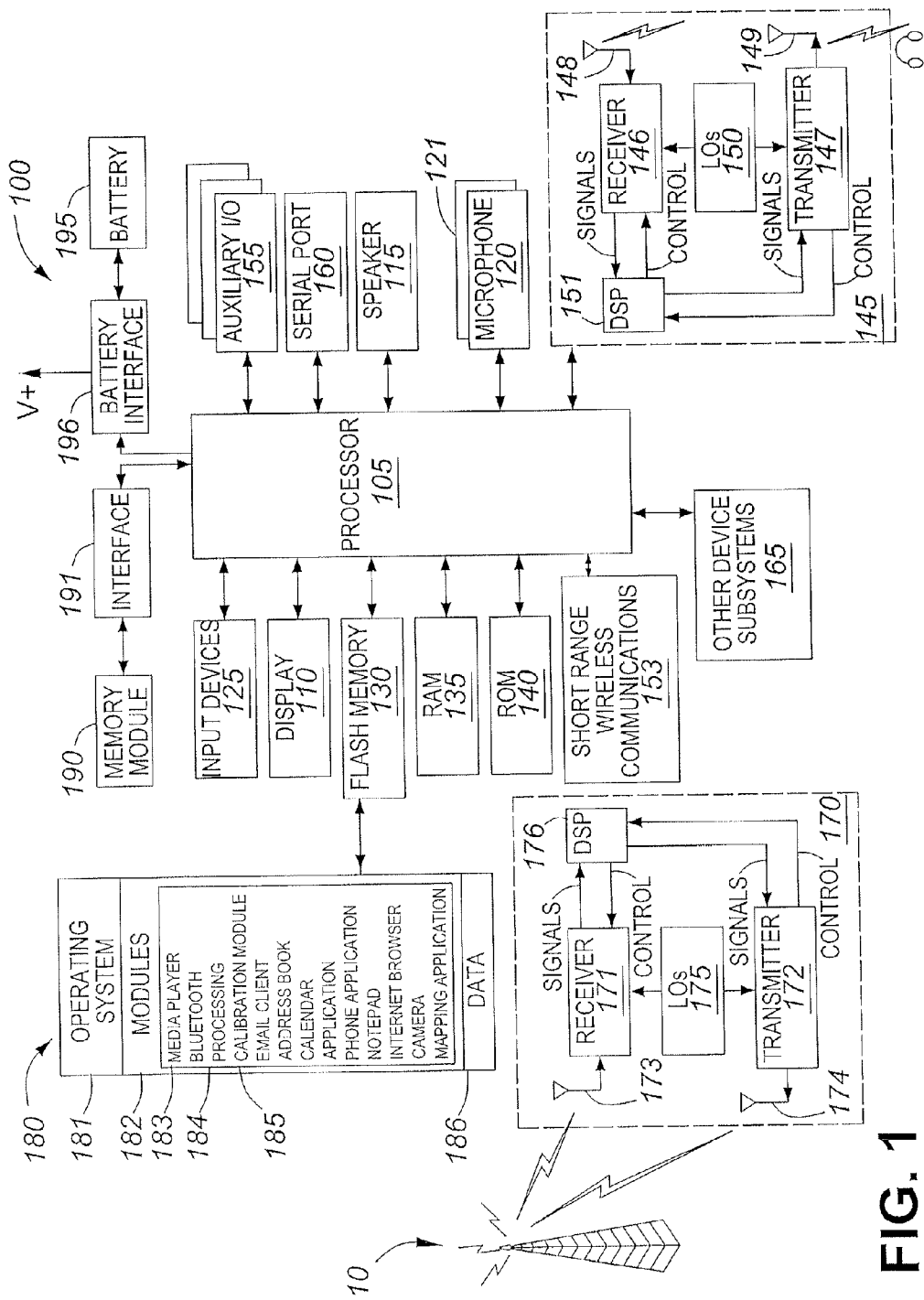
FIG. 1 is a block diagram illustrating a mobile communication device in accordance with one example embodiment of the present disclosure.

The present disclosure provides an example embodiment of a multimedia playback calibration method that includes a calibration module operating on a mobile communication device to cause the mobile device to: introduce test data at a first end, in the mobile device, of a playback path and receive data, played back by a playback device at a second end of the playback path, at a sensor integral to the mobile device; compare the received data against the test data to determine a characteristic of the playback path; and configure the mobile device to compensate for this characteristic.

The present disclosure also provides an example embodiment of a mobile communication device including a handheld casing enclosing a central processing unit, a multimedia player module for initiating playback of at least one data stream on a playback device, a communication capability for forwarding the at least one data stream from the mobile device to the playback device along a playback path, and a calibration module to cause the mobile device to introduce test data at a first end, in the device, of the playback path and receive data, played back by the playback device at a second end of the playback path, at a sensor integral to the mobile device and compare the received data against the test data to determine a characteristic of the playback path, and to configure the mobile device to compensate for this characteristic.

The present disclosure also provides an example embodiment of a computer program product including a computer readable medium and stored on the computer readable medium, computer-readable and computer-executable instructions, which when executed by a central processing unit of a mobile communication device, cause the mobile device to: introduce test data at a first end, in the mobile device, of a playback path and receive data, played back by a playback device at a second end of the playback path, at a sensor integral to the mobile device and compare the received data against the test data to determine a characteristic of the playback path, and to configure the mobile device to compensate for this characteristic.

The characteristic may be, in some example embodiments, a delay introduced in the playback path relative to a playback path of a complementary data stream, such as for corresponding audio and video streams from a multimedia file. The mobile device may be configured to compensate for such characteristic by ensuring that the delayed data stream is played in advance of the complementary data stream by an amount of time equal to the relative delay between them.

The characteristic may be, in some example embodiments, a degradation in the signal spectrum of the data stream as it is played back along the playback path. The mobile device may be configured to compensate for such characteristic by adjusting the equalization of the playback path to counteract such degradation.

The characteristic may be determined for a number of particular playback devices and the mobile device may be configured to compensate for such characteristic in respect of each such playback device.

In some example embodiments, the test data is audio data and the sensor is a microphone.

Mobile Communication Device

Reference is now made to FIG. 1, which illustrates a mobile device 100 in which example embodiments described in the present disclosure can be applied. The mobile device 100 is a media player with the ability to read multimedia data files 300 and to extract and process at least one data stream for output along a playback path to a corresponding playback device, which may be contained in the mobile device 100 or connected to the mobile device 100 by a communication capability available on the mobile device 100.

In some example embodiments, the mobile device 100 may be a two-way communication device having data and voice communication capabilities, and the capability to communicate with other computer systems, for example, via the Internet. Depending on the functionality provided by the mobile device 100, in various embodiments the device 100 may be a multiple-mode communication device configured for both data and voice communication, a smartphone, a mobile telephone or a personal digital assistant (PDA) enabled for wireless communication, or a computer system with a wireless modem.

The mobile device 100 includes a rigid case (not shown) housing the components of the device 100. The internal components of the device 100 are constructed in some example embodiments on one or more printed circuit boards (PCBs) and/or integrated circuits (ICs). The mobile device 100 includes a controller comprising at least one processor 105 (such as a microprocessor), which controls the overall operation of the device 100.

The processor 105 interacts with device subsystems including a display screen 110 such as a liquid crystal display (LCD) screen; speaker 115; a sensor 121 such as microphone 120; input devices 125 such as a keyboard and control buttons; flash memory 130; random access memory (RAM) 135; read only memory (ROM) 140; a Bluetooth™ communication subsystem 145; short-range wireless communication subsystem 153; auxiliary input/output (I/O) subsystems 155; a data port 160 such as a serial data port, or a Universal Serial Bus (USB) data port; other device subsystems generally designated as 165; and a wireless communication subsystem 170 or combinations thereof. In some example embodiments, the processor 105 interacts with a device subsystem such as a wireless communication subsystem 170 for exchanging radio frequency signals with a wireless network 10 to perform communication functions. Some of the subsystems shown in FIG. 1 may provide "resident" or on-device functions whereas other subsystems may provide communication-related functions.

The processor 105 operates under stored program control and executes software modules 180 stored in memory such as persistent memory, for example, in the flash memory 130. As illustrated in FIG. 1, the software modules 180 comprise operating software 181 and software modules 182 comprising a media player module 183, a Bluetooth™ processing module 184 and a calibration module 185. Example embodiments of the media player module 183, Bluetooth™ processing module 184 and calibration module 185 will be discussed in detail later herein.

The software modules 180 may also include a variety of modules, including, for example, an e-mail messaging module (also referred to as an e-mail client), a personal address book module, a calendar module, a phone module, a notepad module, an Internet browser module, a camera module or a mapping module, or combinations thereof. Each of the software modules 180 may include layout information defining the placement of particular fields and graphic elements (e.g. text fields, input fields, icons, etc.) in the user interface (i.e. the display screen 110) according to the module.

A pre-determined set of modules that control basic device operations, including data and possibly voice communication may be installed on the mobile device 100 during or after manufacture. Additional modules or upgrades to the operating system 181 or software modules 182 may also be downloaded onto the mobile device 100 from the wireless network 10 through the wireless communication subsystem 170, the auxiliary I/O subsystem 155, the serial port 160, the Bluetooth™ communication subsystem 145, the short-range communication subsystem 153 or other suitable device subsystem 165.

The downloaded modules may be permanently installed, for example, written into the program memory (i.e. ROM 140, flash memory 130), or written into and executed from the RAM 135 for execution by the processor 105 at run-time. Such flexibility in installation increases the functionality of the mobile device 100 and may provide enhanced on-device functions, communication-related functions, or both.

The software modules 180, or parts thereof, may be temporarily loaded into volatile memory such as the RAM 135. The RAM 135 is used for storing run-time data variables and other types of data or information. Although specific functions are described for various types of memory, this is merely one example and different assignments of functions to types of memory could also be used.

The input devices 125, or alternatively the auxiliary I/O subsystems 155 may further comprise a pointing or navigational input device such as a clickable trackball or scroll wheel or thumbwheel. The auxiliary I/O subsystems 155 may also comprise a vibrating element for providing vibratory notifications in response to various events on the mobile device 100 such as receipt of an electronic message or incoming phone call, or for other purposes such as haptic (touch) feedback.

In some example embodiments, the auxiliary I/O subsystems 155 may comprise wired or wireless communication interfaces or both. Wired communication interfaces may include, without limitation, an external communication link or interface, for example, an Ethernet connection, a speaker such as speaker 115, a serial port 160, such as a USB interface, a earphone jack for accepting a wired headset or earphone and audio/video cabling connections including, without limitation, two-wire, twisted pair, VGA, RCA, red green blue (RGB), composite video, RGB plus horizontal and vertical sync (RGBHV), component (YPbPr), digital visual interface (DVI) and high definition multimedia interface (HDMI) or combinations thereof.

Figure 2:
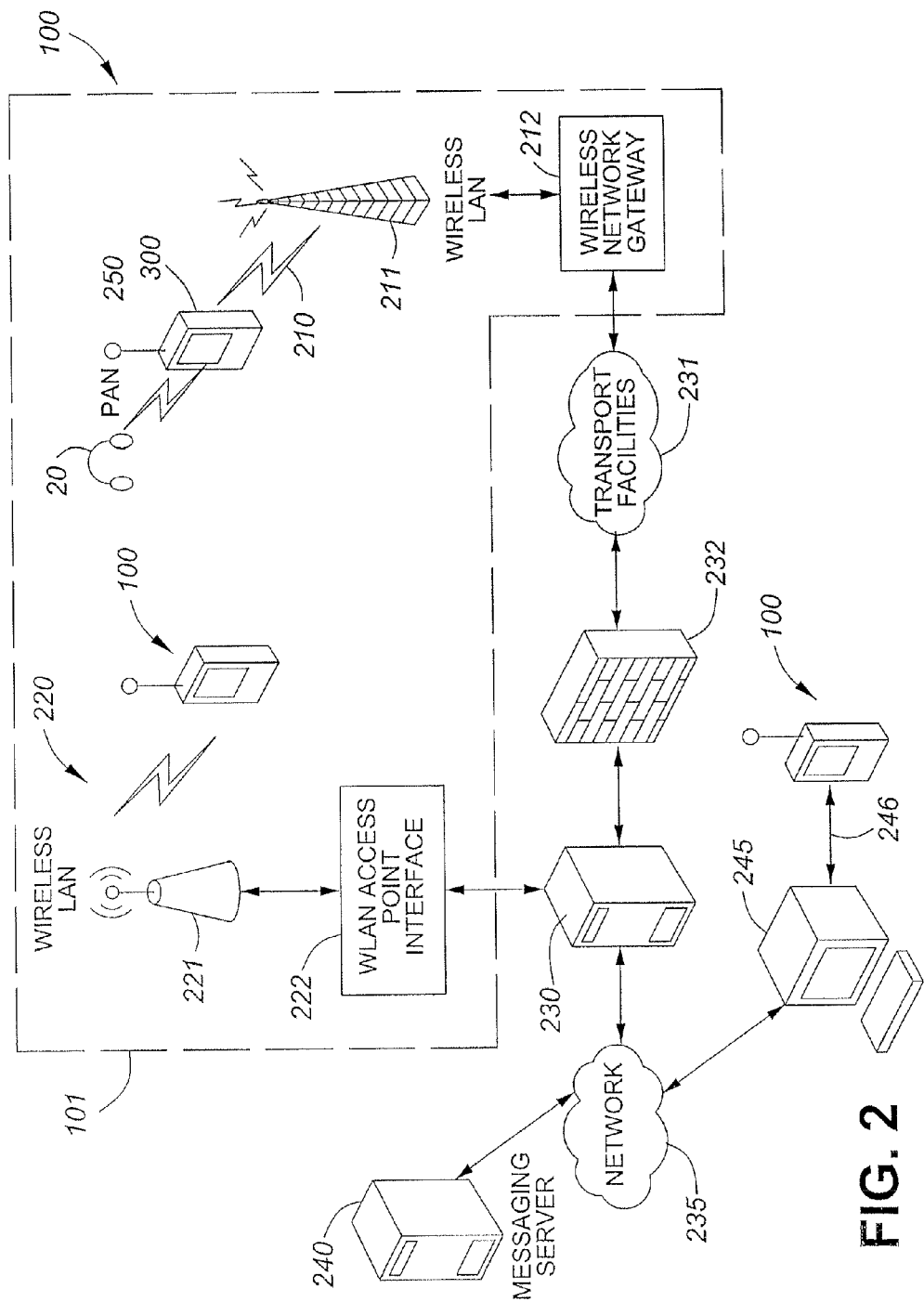
FIG. 2 is a block diagram illustrating a communication system including the mobile device of FIG. 1, in which example embodiments of the present disclosure can be applied.

Wireless communication interfaces may include Bluetooth™ communications such as Bluetooth™ communication subsystem 145, short-range wireless communication subsystem 153 or wireless communication interfaces such as wireless communication subsystem 170 for communicating to a wireless communications network 10, which may comprise one or more of a Wireless Wide Area network (WWAN) 210 and a Wireless Local Area Network (WLAN) 220 or other suitable network arrangements as shown in FIG. 2 and as discussed below. In some example embodiments, the mobile device 100 is configured to communicate over both of the WWAN 210 and WLAN 220, and to roam between these networks. In some example embodiments, the wireless network 10 may comprise multiple WWANs 210 and WLANs 220.

The mobile device 100 may send and receive communication signals over the wireless network 10 along wireless communication subsystem 170 after appropriate network registration or activation procedures have been completed. Wireless communication subsystem 170 may comprise a receiver 171, a transmitter 172, and associated components, such as one or more antenna elements 173, 174, local oscillators (LOs) 175, and a processing module such as a digital signal processor (DSP) 176. The antenna elements 173, 174 may be embedded or internal to the mobile device 100, and a single antenna may be shared by both receiver and transmitter, by both the wireless communication subsystem 170 and other communication subsystems such as Bluetooth™ communication subsystem 145 and short-range wireless communication subsystem 153 or any combination thereof. The particular design of the wireless communication subsystem 170 depends upon the nature of the wireless network(s) 10 in which the mobile device 100 is intended to operate.

Signals received by the antenna 173 from the wireless network 10 are input to the receiver 171, which may perform such common receiver functions as signal amplification, frequency down conversion, filtering, channel selection, etc., as well as analog-to-digital (A/D) conversion, which allows more complex communication functions such as demodulation and decoding to be performed by DSP 176.

In a similar manner, signals to be transmitted to the wireless network 10 are processed, including by modulation and encoding, for example, by DSP 176. Such DSP-processed signals are output to the transmitter 172, for digital-to-analog (D/A) conversion, frequency up conversion, filtering, amplification and transmission to the wireless network 10 by antenna 174.

DSP 176 may, in addition to processing communication signals, provide for control of the receiver 171 and transmitter 172 or either of them, such as by adaptively controlling the gains applied to communication signals in the receiver 171 and transmitter 172 or either of them by automatic gain control algorithms implemented in the DSP 176.

The mobile device 100 may provide either or both of two principal modes of communication, namely a data communication mode and a voice communication mode. In the data communication mode, a received data signal such as a text message, an e-mail message or a Web page download will be processed by the communication subsystem 170 and input to the processor 105 for further processing including, without limitation, display on the display screen 110. A user of the mobile device 100 may also compose data items, such as a text message or an e-mail message using the input devices 125 and auxiliary I/O devices 155 or combinations thereof in conjunction with the display 110, for transmission through the wireless communication subsystem 170 over the wireless network 10.

In the voice communication mode, the mobile device 100 provides telephony functions and operates as a cellular phone. The overall operation is similar to the data communication mode except that the received signals may be output to the speaker 115 and signals for transmission may be received by a sensor 121 such as the microphone 120. The telephony functions may be provided by a combination of software/firmware such as the phone module and hardware such as the speaker 115, microphone 120, input devices 125 and wireless communication subsystem 170. Although voice or audio signal output is typically accomplished primarily through the speaker 115, the display screen 110 may be used to provide an indication of the identity of a calling party, duration of a voice call, or other voice call-related information. Alternative voice or audio I/O subsystems, such as a voice message recording subsystem, may be implemented on the mobile device 100.

Other types of wireless communication interfaces may include a receiver or transceiver (not shown) for communicating with a satellite positioning system such as the Global Positioning System (GPS).

The short-range communication subsystem 153 is an additional component which provides for communication between the mobile device 100 and different systems or devices, which need not necessarily be similar devices. The short-range communication subsystem 153 may include an infrared device and associated circuits and components, or a wireless bus protocol compliant communication mechanism such as a Bluetooth™ communication subsystem to provide for communication with similarly-enabled systems and devices.

The Bluetooth™ communication subsystem 145 is explicitly broken out for ease of description of example embodiments of this disclosure. In some example embodiments, it will have a similar architecture to that of the wireless communication subsystem 170, including a receiver 146, a transmitter 147, and associated components, such as one or more antenna elements 148, 149, local oscillators 150, and a processing module such as a digital signal processor 151. In some example embodiments, DSP 151 may be absent and its functionality performed by processor 105. The processing performed by the DSP 151 or the processor 105 or combinations thereof may comprise one or more functions of the Bluetooth™ processing module 184.

One or more of the antenna elements 148, 149, local oscillators 140 and DSP 151 may be the same and/or may operate in a similar fashion as corresponding components from the wireless communication subsystem 170 with the exception of operating frequency and transmission range. Bluetooth™ communications typically use operating frequencies in the range of 2.4000 to 2.4835 GHz, in three classes, having respective approximate communication ranges of 1, 10 and 100 metres. In some example embodiments, the mobile device 100 may support Bluetooth™ communications in the 10 meter range.

In some example embodiments, the components of the Bluetooth™ communication subsystem 145 may comprise one or more integrated circuits incorporating one or more functions of the Bluetooth™ processing module 184 including, without limitation, receive, transmit, processing and connection management functions, such as Bluetooth™ control or baseband conversion.

The Bluetooth™ communication subsystem 145 permits the mobile device 100 to act as a Bluetooth™-enabled component that may communicate with another Bluetooth™-enabled component such as Bluetooth™ headset 20. Two Bluetooth™-enabled components agree to communicate with one another through pairing, an activity initiated by one component in operational proximity of the other component. Typically, in the context of the mobile device 100 and the Bluetooth™ headset 20, the pairing inquiry will be initiated by the mobile device 100. In response to such inquiry, the Bluetooth™ headset 20 will transmit information wirelessly to the mobile device 100 such as a device name, class, list of services and functions as well as other technical information such as the device manufacturer.

In some example embodiments, some or all of such information may be set out in a supported profile that specifies the supported applications and how such applications work, in order to ensure interoperability of devices. If profiles are supported, information about such profiles may be transmitted in place of the information itself during the pairing process. An example Bluetooth™ profile is the Advanced Audio Distribution Profile (A2DP) which defines how audio data may be streamed from one device to another.

Once Bluetooth™ components have been paired, a personal area network (PAN) 250 is created. A PAN is a wireless point to point connection, meaning no physical cables are used to connect the two end points.

In some example embodiments, the mobile device 100 includes a removable memory card or module 190 (which may comprise flash memory) and a memory card interface 191. Network communication access is typically associated with a subscriber or user of the mobile device 100 via the memory card 190, which may be a Subscriber Identity Module (SIM) card for use in a Global System for Mobile Communication (GSM) network or other type of memory card for use in the relevant wireless network type, or a separate memory card for user data storage or combinations thereof. The memory card 190 is inserted in or connected to the memory card interface 191 of the mobile device 100.

The mobile device 100 stores other data 186 in an erasable persistent memory, which in one example embodiment is the flash memory 130. In some example embodiments, the data 186 includes service data comprising information used by the mobile device 100 to establish and maintain communication with the wireless network 10. The data 186 may also include user application data such as e-mail messages, address book and contact information, calendar and schedule information, notepad documents, image files, multimedia data files and configuration data, as well as other commonly stored user information stored on the mobile device 100 by its user including, without limitation, Bluetooth™ pairing data and/or playback device calibration data, and other data. In addition, or alternatively, such user data 186 may be stored in a memory card 190.

The data 186 stored in the persistent memory of the mobile device 100 may be organized, at least partially, into a number of databases each containing data items of the same data type or associated with the same module 180.

The mobile device 100 also may include a battery 195 as a power source, which may in some example embodiments comprise one or more rechargeable batteries that may be charged, for example, through charging circuitry coupled to a battery interface 196 such as the serial data port 160. The battery 195 provides electrical power to at least some of the electrical circuitry in the mobile device 100, and the battery interface 196 is coupled to a regulator (not shown) which provides power V+ to the circuitry of the mobile device 100.

Communications Environment

The WWAN 210 may be implemented as any suitable wireless access network technology. By way of non-limiting example the WWAN 210 may be implemented as a wireless network that includes a number of transceiver base stations 211 (one of which is shown in FIG. 2) where each of the base stations 211 provides wireless Radio Frequency (RF) coverage to a corresponding area or cell. The WWAN 210 is typically operated by a mobile network service provider that provides subscription packages to users of the mobile devices 100. In some embodiments, the WWAN 210 conforms to one or more of the following wireless network types: Mobitex Radio Network, DataTAC, GSM, General Packet Radio System (GPRS), Time Division Multiple Access (TDMA), Code Division Multiple Access (CDMA), Cellular Digital Packet Data (CPDP), Integrated Digital Enhanced Network (IDEN), Evolution-Data Optimized (EvDO), CDMA2000, Enhanced Data Rates for GSM Evolution (EDGE), Universal Mobile Telecommunications Systems (UMTS), High-Speed Downlink Packet Access (HSDPA), Worldwide Interoperability for Microwave Access (WiMAX, also referred to IEEE802.16e), Long Term Evolution (LTE), or various other networks. Although WWAN 210 is described as a "Wide-Area" network, that term is intended herein to also incorporate wireless Metropolitan Area Networks (WMAN) and other similar technologies for providing coordinated service wirelessly over an area larger than that covered by typical WLANs.

The WWAN 210 may further comprise a wireless network gateway 212 that connects the mobile devices 100 to transport facilities 231 and through the transport facilities 231 to a wireless connector system 230. Transport facilities may include one or more private networks or lines, the public internet, a virtual private network (VPN), or any other suitable network. The wireless connector system 230 may be operated, for example, by an organization or enterprise such as a corporation, university or governmental department, which allows access to a network 235 such as an internal or enterprise network and its resources, or the wireless connector system 230 may be operated by a mobile network provider. In some example embodiments, the network 235 may be realised using the Internet rather than an internal or enterprise network.

The wireless network gateway 212 provides an interface between the wireless connector system 230 and the WWAN 210, which facilitates communication between the mobile devices 100 and other devices (not shown) connected, directly or indirectly to the WWAN 210. Accordingly, communications sent via the mobile device 100 are transported via the WWAN 210 and the wireless network gateway 212 through transport facilities 231 to the wireless connector system 230. Communications sent from the wireless connector system 230 are received by the wireless network gateway 212 and transported via the WWAN 210 to the mobile devices 100.

The WLAN 220 comprises a wireless network which, in some embodiments, conforms to IEEE 802.11x standards (sometimes referred to as Wi-Fi) such as, for example, the IEEE 802.11a, 802.11b and/or 802.11g standards. Other communication protocols may be used for the WLAN 220 in other embodiments, such as, for example, IEEE 802.11n, IEEE 802.16e (also referred to as WIMAX), or IEEE 802.20 (also referred to as Mobile Wireless Broadband Access). The WLAN 220 includes one or more wireless RF access points (APs) 221 (one of which is shown in FIG. 2) that collectively provide a WLAN coverage area.

The WLAN 220 may be a personal network of the user, an enterprise network, or a hotspot offered by an internet service provider (ISP), a mobile network provider or a property owner in a public or semi-public area, for example. The access points 221 are connected to an access point interface 222 which may connect to the wireless connector system 230 directly (for example, if the access point 221 is part of an enterprise WLAN 220 in which the wireless connector system 230 resides), or indirectly via the transport facilities 231 if the access point 231 is a personal Wi-Fi network or Wi-Fi hotspot (in which case a mechanism for securely connecting to the wireless connector system 230, such as a virtual private network (VPN) may be appropriate). The AP interface 222 provides translation and routing services between the access points 221 and the wireless connector system 230 to facilitate communication, directly or indirectly, with the wireless connector system 230.

The wireless connector system 230 may be implemented as one or more servers, and is typically located behind a firewall 232. The wireless connector system 230 manages communications, including e-mail messages, to and from a set of managed mobile devices 100. The wireless connector system 230 also provides administrative control and management capabilities over users and mobile devices 100 which may connect to the wireless connector system 120.

The wireless connector system 230 allows the mobile devices 100 to access the network 235 and connected resources and services such as a messaging server 240. The wireless connector system 230 typically provides a secure exchange of data (e.g. e-mail messages, personal information manager (PIM) data, and instant messaging (IM) data) with the mobile devices 100.

The wireless network gateway 212 is adapted to send data packets received from the mobile device 100 over the WWAN 210 to the wireless connector system 230. The wireless connector system 230 then sends the data packets to the appropriate connection point such as the messaging server 240 or other servers (not shown). Conversely, the wireless connector system 230 sends data packets received, for example, from the messaging server 240 or other server (not shown) to the wireless network gateway 212 which then transmits the data packets to the destination mobile device 100.

The AP interface 222 of the WLAN 220 provides similar sending functions between the mobile device 100, the wireless connector system 230 and a network connection point such as the messaging server 240 or other server (not shown).

The network 235 may comprise a private local area network, metropolitan area network, wide area network, the public Internet or any combination thereof and may include virtual networks constructed using any of these, alone, or in combination. Computers 245 may be connected to the network 235 directly or indirectly via an intermediate communication network such as the Internet. When computers 245 connect to the network 235 indirectly, such as by the Internet, a VPN or other mechanism for securely connecting to the network 235 may be appropriate. Computers 245 may be of any suitable construction and include at least a processor and a display screen, one or more user input devices and a memory each connected to the processor. The computers 245 could be desktop computers, laptop/notebook/netbook computers, or any combination thereof, and may have wired or wireless communication subsystems for connecting to the network 235.

A mobile device 100 may alternatively connect to the wireless connector system 230 using a computer 245 via the network 235. In at least some example embodiments, for security purposes, the computers 245 with which the mobile devices 100 can connect to the wireless connector system 230 are limited to computers 245 which are directly connected to the network 235. A link 246 may be provided for exchanging information between the mobile device 100 and the computer 245 connected to the wireless connector system 230. The link 246 may comprise one or both of a physical interface and short-range wireless communication interface. The physical interface may comprise one or combinations of an Ethernet connection, serial port 160 such as a USB connection, Firewire™ (also known as an IEEE 1394 interface) connection, or other serial data connection, via respective ports or interfaces of the mobile device 100 and computer 245. The short-range communication interface may be a PAN interface such as Bluetooth™ communications subsystem 145 or short-range wireless communications subsystem 153.

The above-described communication system is provided for the purpose of example and illustration only, and the above-described communication system comprises one possible communication network configuration of a multitude of possible configurations for use with the mobile devices 100. The teachings of the present disclosure may be employed in connection with any other type of network and associated devices that are effective in implementing or facilitating wireless communication. Other suitable variations of the communication system will become apparent and are intended to fall within the scope of the present disclosure.

Media Player

Figure 3:
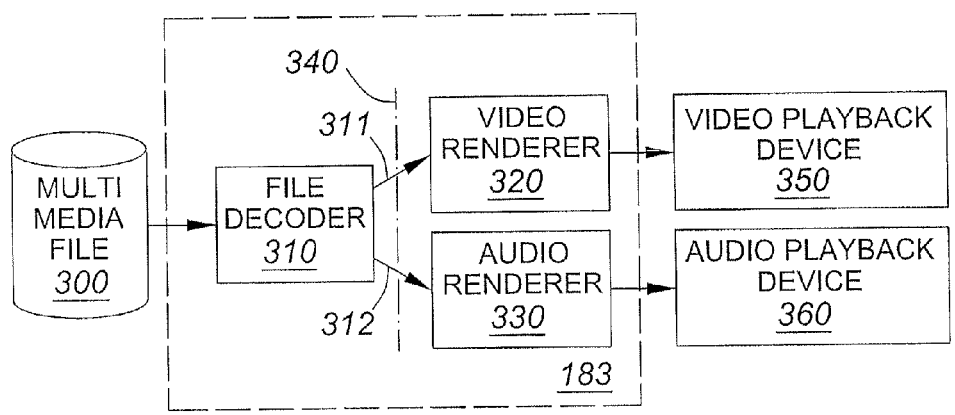
FIG. 3 is a block diagram of an example media player module for use in the device of FIG. 1.

The media player module 183 is a software module that takes a multimedia data file 300, such as may be stored in persistent memory such as flash memory 130 or a memory module 190, extracts one or more data streams from it, which may, in some example embodiments comprise a video data stream 311 or an audio data stream 312 or combinations thereof. The media player module 183 processes them for playback on respective video playback devices 350 or audio playback devices 360, which may be integral to the mobile device 100 or external to it as illustrated in FIG. 3. Video playback devices 350 may include in some example embodiments: display 110; external I/O devices for wired connection through the auxiliary I/O subsystem 155 such as an external monitor or video system; external I/O devices for wireless connection through the Bluetooth™ communication subsystem 145 such as a Bluetooth™ display component (not shown); or external I/O devices for wireless connection through the short-range wireless communication subsystem 153 such as an infrared connected device (not shown). Audio playback devices 360 may include in some example embodiments: speaker 115; external I/O devices for wired connection through the auxiliary I/O subsystem 155 such as an external speaker or audio system; external I/O devices for wireless connection through the Bluetooth™ communication subsystem 145 such as Bluetooth™ headset 20; or external I/O devices for wireless connection through the short-range wireless communication subsystem 153 such as an infrared connected device (not shown). In some example embodiments, the playback device 350, 360 may be integral to the mobile device 100, such as display 110 or speaker 115.

The multimedia data file 300 may in some example embodiments, be in digital form, with the result that the extracted video data stream 311 and audio data stream 312 are digital data streams.

The media player module 183 may in some example embodiments contain software embodying one or more functions, including a file decoder 310, video renderer 320 and audio renderer 330.

The file decoder function 310 causes the processor 105 to decode or separate the multimedia file 300 into its constituent data streams, such as a video data stream 311 and an audio data stream 312 for playback on the respective video playback path 435 and audio playback path 430. In some example embodiments, where the multimedia data file 300 is in analog rather than digital form, the file decoder function 310 may incorporate analog to digital (A/D) conversion processing to generate digital data streams. Such A/D processing may employ one or more hardware A/D converters (ADCs) (not shown).

(As described herein, each data stream undergoes certain processing and transformation as it travels along a playback path from the file decoder function 310 on the mobile device 100 until it is played back by a playback device 350, 360. For purposes of explanation of the described example embodiments only, the data stream is commonly referred to a data stream, irrespective of any processing and transformation that may be performed and which may, in some aspects, be seen to alter the form or character of the data stream, for example, between baseband and RF or between analog and digital forms.)

The video renderer function 320 causes the processor 105 to process the video data stream 311 at least partially into a format suitable for display by a video playback device 350.

The audio renderer function 330 causes the processor 105 to process the audio data stream 312 at least partially into a format suitable for display by an audio playback device 360. The format of the audio data stream 312 in some example embodiments, may be raw audio data.

At a first end of each of the video playback path 435 and audio playback path 430, corresponding to the output of the processing of each of the video data stream 311 and the audio data stream 312 and shown representationally at dashed line 340, the data streams are synchronized for playback. (Those having ordinary skill in this art will appreciate that conceptually, the first end of both the video playback path 435 and the audio playback path 430 commences at the left-most edge of the dashed box delineating these playback paths. However, for clarity of illustration, the dashed line 340 is shown separately. Despite the separation between the dashed boxes delineating the playback paths 430, 435 and the dashed line 340, it should be understood that they in fact coincide and in particular that there is no time or other difference between these conceptual points.)

The synchronization at the first end 340 of each of the video playback path 435 and the audio playback path 430 is typically irrespective of whether the multimedia data file 300 is a file comprising both video data stream 311 and audio data stream 312, such as a movie, or a plurality of separate files for simultaneous playback, such as may be the case with an audio track such as a song and an accompanying text file that may contain the lyrics of the song for simultaneous playback such as in an example karaoke embodiment.

However, depending upon the nature of the respective video playback device 350 and audio playback device 360 and the processing to be performed on the corresponding video data stream 311 and audio data stream 312, synchronization may be lost along the playback path. If the lack of synchronization is discernable, such as when the relative delay is greater than substantially about 20 ms to 30 ms, user enjoyment of the playback of the multimedia data file 300 may become impaired.

Figure 4:
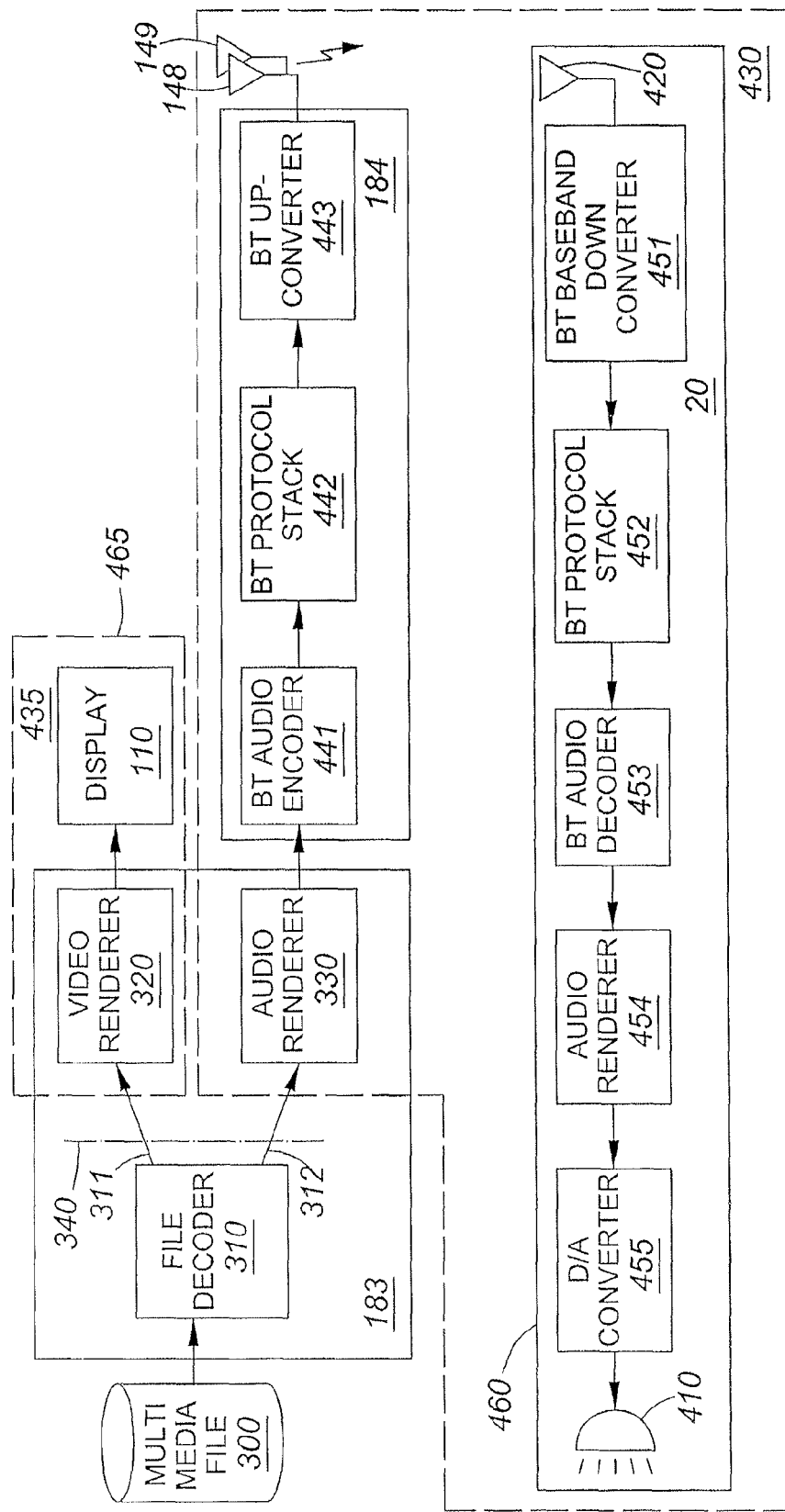
FIG. 4 is a block diagram of the media player module of FIG. 3 in conjunction with an example embodiment of a playback path between the device of FIG. 1 and a example playback device.

This may be demonstrated by an example embodiment shown as FIG. 4 in which the video playback device 350 is the internal display screen 110 of the mobile device 100, and the audio playback device 360 is a Bluetooth™ headset 20, shown representationally as having one or more speakers 410 and at least one antenna element 420. The audio playback path, shown in phantom at 430, includes, together with the audio renderer function 330 of the media player module 180, functional blocks associated with the Bluetooth™ processing module 184, which makes use of components of the Bluetooth™ communication subsystem 145 in the mobile device 100 and functional blocks associated with software/firmware in the Bluetooth™ headset 20.

Bluetooth™ Processing Module and Bluetooth™ Headset Processing

In the example embodiment described in FIG. 4, the Bluetooth™ headset 20 acts as the audio playback device 360. In order for the Bluetooth™ headset 20 to be able to receive and process the audio data stream 312 output by the audio renderer function 330, the audio data stream 312 is initially processed by the Bluetooth™ processing module 184.

The Bluetooth™ processing module 184 may in some example embodiments contain software embodying certain functions, including one or more of a Bluetooth™ audio encoding function 441, a Bluetooth™ protocol stack function 442 and a function for upconversion from baseband to a Bluetooth™ frequency 443. In some example embodiments, one or more functions of the Bluetooth™ processing module 184 may be undertaken by the DSP 151 of the Bluetooth™ communication subsystem 145 or the processor 105 or combinations thereof.

The audio data stream 312 comprising raw audio data generated by the audio renderer function 330 of the media player module 183 is received by the Bluetooth™ audio encoder function 441, which encodes it for transmission to the Bluetooth™ headset 20. The specific encoding format employed may be selected from among the various audio formats that may be supported by both the Bluetooth™ headset 20 and the mobile device 100. Such audio formats may include, without limitation, MPEG-1 Audiolayer 3 (MP3), Sub-Band coding (SBC) or Advanced Audio Coding (AAC). The A2DP profile mandates that the mobile device 100 and the Bluetooth™ headset 20 supporting the A2DP profile each support at least the SBC audio format.

The Bluetooth™ protocol stack function 442 is a software implementation of a suite of computer networking protocol modules for implementing the Bluetooth™ standard. A protocol module typically interacts with a higher-level and lower-level module, the lowermost module interacting physically with the hardware and the uppermost layer interacting with a user application. The protocol modules can thus be imagined as a stack of such protocol modules.

The appropriate protocol module in the Bluetooth™ protocol stack function 442 receives the encoded audio data stream 312 and processes it for transmission to the Bluetooth™ headset 20 by inter alia making one or more calls to lower-level protocol modules in the Bluetooth™ protocol stack function 442.

The result of the processing by the Bluetooth™ protocol stack function 442 is forwarded to the Bluetooth™ upconversion function 443, which translates the resulting audio data stream 312 from baseband (or in some example embodiments, an intermediate frequency) to the appropriate Bluetooth™ frequency.

The Bluetooth™ upconversion function 443 thereafter forwards the upconverted audio data stream 312 to the transmitter 147 of the Bluetooth™ communication subsystem 145 for wireless transmission by antenna element 149 through the PAN 250 to the Bluetooth™ headset 20, when in operational proximity to the mobile device 100.

This wireless signal is received by the Bluetooth™ headset 20 (when in operational proximity to the mobile device 100) at its associated antenna element 420 and processed by one or more functions of the Bluetooth™ headset 20, which may be defined in software/firmware on the headset 20 and executed on a processor (not shown) therein. These functions may, in some example embodiments, include one or more of a Bluetooth™ baseband downconversion function 451, a Bluetooth™ protocol stack function 452, a Bluetooth™ audio decoder function 453, an audio rendering function 454 and a digital/analog (D/A) processing function 455.

The Bluetooth™ baseband downconversion function 451 translates the received audio data stream 312 down from its Bluetooth™ frequency to baseband or in some example embodiments, an intermediate frequency (collectively "baseband") for ease of processing.

The Bluetooth™ baseband downconversion function 451 thereafter forwards the baseband audio data stream 312 to the Bluetooth™ protocol stack function 452. The Bluetooth™ protocol stack function 452 is similar in terms of structure and functionality to the Bluetooth™ protocol stack function 442 in that the appropriate protocol module in the Bluetooth™ protocol stack function 452 receives the baseband audio data stream 312 and processes it for decoding and playback by inter alia making one or more calls to lower-level protocol modules in the Bluetooth™ protocol stack function 452.

The result of the processing by the Bluetooth™ protocol stack function 452 is forwarded to the Bluetooth™ audio decoder 453. The particular Bluetooth™ encoding format employed by the Bluetooth™ audio encoder function 441 is decoded by the Bluetooth™ audio decoder function 453 into raw audio data for processing by the audio renderer 454. The specific encoding format employed may be selected from among the various audio formats that may be supported by both the Bluetooth™ headset 20 and the mobile device 100.

Such audio formats may include, without limitation, MP3, SBC or AAC. The A2DP profile mandates that the mobile device 100 and the Bluetooth™ headset 20 exchanging such profile each support at least the SBC audio format.

The audio renderer function 454 receives the raw audio data stream 312 generated by the Bluetooth audio decoding function 453 and processes into a digital format suitable for playback by the speaker 410 of the Bluetooth™ headset 20.

In some example embodiments, for example where the audio data stream 312 extracted by the file decoding function 310 of the media player module 183 is encoded in the MP3 audio format and the Bluetooth™ headset 20 recognizes and handles the MP3 format, some or all of the audio renderer function 330 of the media player module 183; the Bluetooth™ audio encoder function 441 of the Bluetooth™ processing module 184; the Bluetooth™ audio decoder function 453 of the module 184; and the audio renderer function 454 of the Bluetooth™ headset 20 may be dispensed with.

In any event, the digital audio data stream 312 is converted from digital to analog format to produce an analog signal for playback on the speaker 410. Such D/A processing may employ one or more hardware D/A converters (DACs) (not shown).

Thus, it may be seen that there may be a number of processing steps or stages along the audio playback path 430 that may result in signal degradation or loss of synchronization between the audio data stream 312 and the video data stream 311 or both.

Depending upon the amount of processing by the audio playback path 430, relative to the video playback path 435, playback of the audio data stream 312 at the audio playback device 360, which constitutes a second end of the audio playback path 430, may be delayed, or in some example embodiments, accelerated, relative to playback of the video data stream 311 at the video playback device 350, which constitutes a second end of the video playback path 435.

Additionally, within a given playback path, the number of processing steps may result, even if the processing is performed digitally, in degradation of the data stream being processed.

Calibration Module

Figure 5:
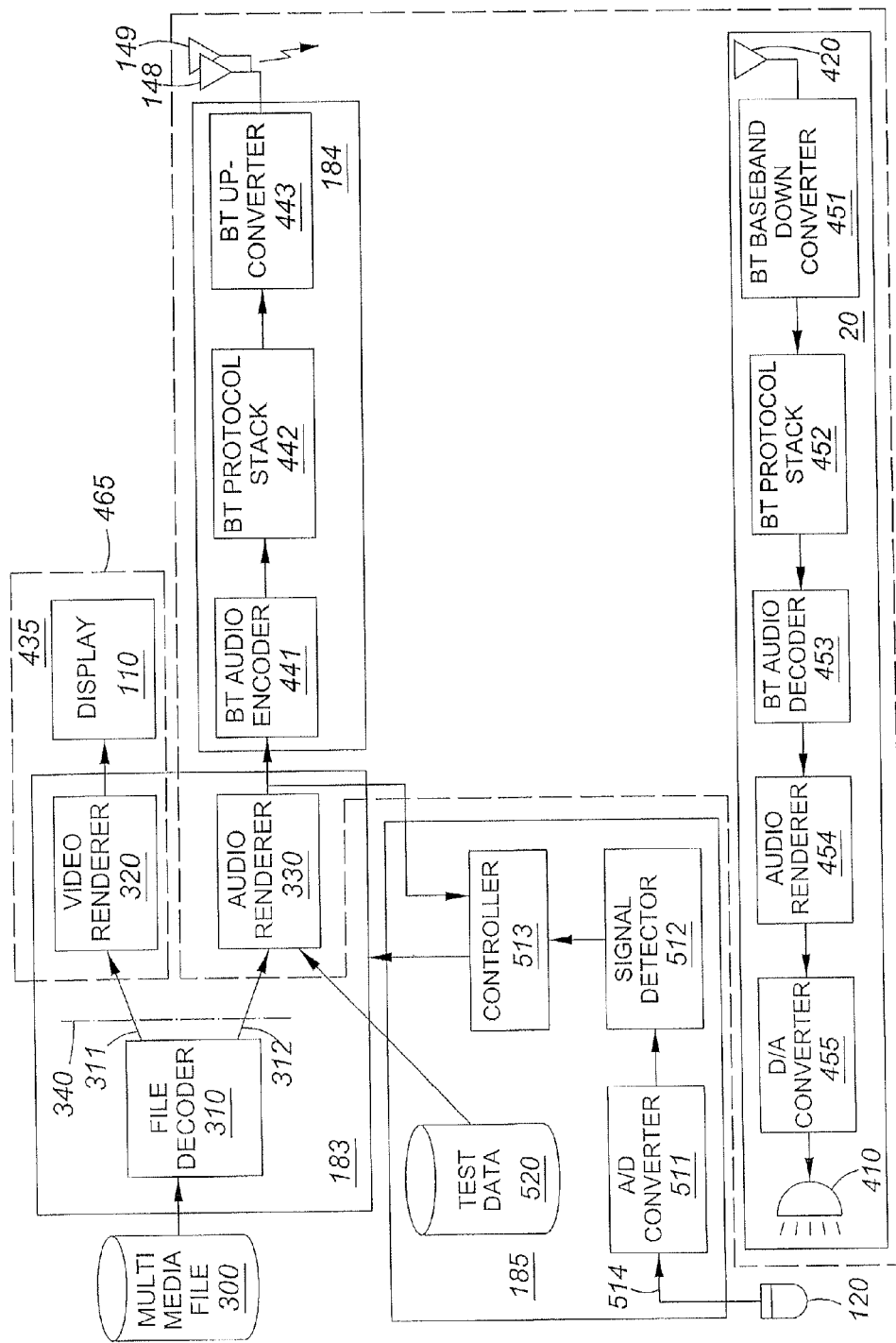
FIG. 5 is a block diagram of an example calibration module for use in the device of FIG. 1 in conjunction with the playback path of FIG. 4.

The calibration module 185 as illustrated in FIG. 5 enables the mobile device 100 to determine one or more characteristics of a playback path, for example, processing delay or signal degradation, when the media player 183 is not in use, in order that measures may be taken by the mobile device 100 during playback of the data stream to compensate for such characteristics of the playback path. Once determined, these characteristics may be stored in persistent memory on the mobile device 100, or otherwise retained, in some example embodiments in association with a particular playback device, and retrieved by the mobile device 100 to allow it to compensate for such characteristic when playing back a multimedia data file 300 on such playback device.

The calibration module 185 makes use of a sensor 121 integral to the mobile device 100, such as microphone 120. Additionally, the calibration module 185 has associated with it, one or more files of test data 520, such as may be stored in persistent memory such as flash memory 130 or a memory module 190. In some example embodiments, the data content in the test data 520 may be configured to facilitate detection of playback of the test data file 520 or a specific portion thereof by the integral sensor 121.

There may in some example embodiments be different test data 520 for different types of playback devices. For example, test data 520 for an audio playback device 360 such as Bluetooth™ headset 20 may be an audio file containing an audio data stream 312 having a discernable pattern such as a monotonically increasing frequency across the audible frequency range and/or amplitude or a fixed frequency for a fixed period of time. A non-limiting example of fixed frequency test data 520 may be a 1 KHz tone for 0.1 s. For a video playback device 350 such as display 110, example test data 520 may be a file containing a video data stream 311 having a video test pattern and/or an easily discernable change in illumination that may facilitate detection by the integral sensor 121.

The calibration module 185 may, in some example embodiments, contain software embodying certain functions, including one or more of an A/D processing function 511, a signal detection function 512 and a calibration controller function 513 or combinations thereof.

The A/D processing function 511 receives data 514 received by the sensor 121 such as microphone 120 and converts the data 514 into digital form. In some example embodiments, the integral sensor 121 may receive or pass on or both the received data 514 in digital form, in which case the A/D processing function may be dispensed with. In any event, the received digital data 514 is fed into the signal detector function 512.

The signal detector function 512 processes the received data 514 to identify a predetermined signal in the received data 514 relevant to the playback path characteristic for forwarding to the calibration controller function 513. The nature of the predetermined signal will vary according to the type of characteristic under investigation, the type of playback device and the type of integral sensor 121 being employed by the calibration module 185.

By way of non-limiting example, as described in FIG. 4, if the playback path characteristic is the processing delay imparted to the audio data stream 312 as it travels along the audio playback path 430 to the Bluetooth™ headset 20 as the audio playback device 360, the integral sensor 121 may be the microphone 120. The test data 520 may in such example, as suggested above, comprise a monotonically increasing frequency across the audible frequency range for a fixed period of time. In such a scenario, the predetermined signal may be a particular frequency in the midrange of the frequency range, for example, 1 kHz. When this predetermined signal is detected by the signal detector function 512, the signal detector function 512 forwards the received data 514, with the detected signal marked, to the calibration controller function 513, together with timing information, so that the time that the predetermined signal was received at the integral sensor 121 may be determined.

The controller 513 is also informed of the time of the start of the playback of the predetermined signal in the test data 520 so that a delay can be calculated as described in detail below. In some example embodiments, this may correspond to being notified of the time of the start of the playback of the test data 520 and a priori knowledge of the playback time between the start of the test data and the start of the predetermined signal.

By way of a second non-limiting example, if the characteristic is the processing delay imparted to the video data stream 311 as it travels along the video playback path 435 to the display 110 as the video playback device 350, the integral sensor 121 may be a light intensity detector (not shown). The test data 520 may in such example comprise a video test pattern having monotonically increasing amplitude for a fixed period of time. In such a scenario, the predetermined signal may be a particular intensity level. When a signal of such intensity is detected by the integral sensor 121, the signal detector function 512 forwards the received data 514, with the detected signal marked, to the calibration controller function 513.

By way of a third non-limiting example, if the characteristic is the signal degradation imparted to the audio data stream 312 as it travels along the audio playback path 430 to the Bluetooth™ headset 20 as the audio playback device 360 and the integral sensor 121 may be the microphone 120. The test data 520 in such example may be the above-described monotonically increasing frequency across the audible frequency range for a fixed period of time and, the predetermined signal may be the entire received data 514, which is forwarded by the signal detector function 512 to the calibration controller function 513 for processing.

The calibration controller function 513 controls the operation of the calibration module 185. It performs one or more of the following functions. First, the calibration controller function 513 causes the media player 183 to extract the test data 520 and introduce it as and for one of the data streams into an appropriate playback path. In FIG. 5, the calibration controller function 513 is shown to cause the test data 520 to be introduced as the audio data stream 312 to the audio renderer function 330 of the media player module 183. In some example embodiments, such as the second non-limiting example discussed above, the calibration controller function 513 may cause the test data 520 to be introduced as the video data stream 311 to the video renderer function 330 of the media player module 183, or combinations thereof.

Second, the calibration controller function 513 may in some example embodiments receive a signal comprising the test data 520 from the media player module 183 complementary to the detected predetermined signal. In FIG. 5, the calibration controller function 513 is shown to cause elements of the media player module 183, for example, the audio renderer function 330 to return the signal from its output audio data stream 312. In some example embodiments, such as the second non-limiting example discussed above, the calibration controller function 513 may cause the video renderer 320 to return the signal from its output video data stream 311 or combinations thereof.

Third, the calibration controller function 513 receives the received data 514, which may be marked with the detected predetermined signal by the signal detector function 512. Fourth, the calibration controller function 513 may provide some configuration and/or control functionality for the operation of the other functional blocks of the calibration module 185.

Figure 6:
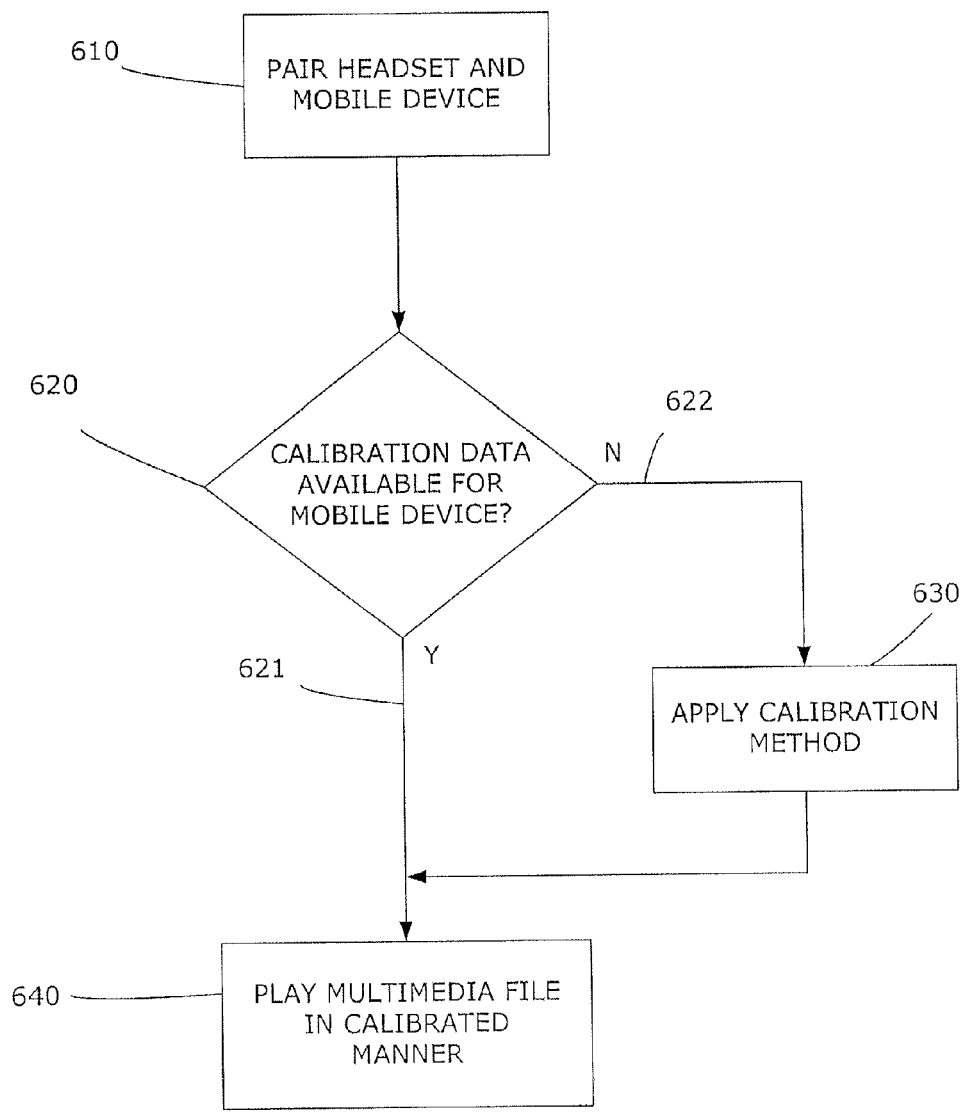
FIG. 6 is a flowchart illustrating example method actions for playing back a multimedia file on the devices and playback path of FIG. 4, in accordance with an example embodiment of the present disclosure.

With reference to the flowchart of FIG. 6, the playback of a multimedia file 300 on the mobile device 100 and the Bluetooth™ headset 20 along the video playback path 435 and audio playback path 430 may be seen to comprise a number of method actions.

The described method actions include, at action 610, pairing the mobile device 100 with the Bluetooth™ headset 20. This may occur when the Bluetooth™ headset 20 is powered on in the vicinity of the mobile device 100, which is already powered on, when the mobile device 100 is powered on in the vicinity of the Bluetooth™ headset 20, which is already powered on, or when the already powered on Bluetooth™ headset 20 and the mobile device 100 are brought within an effective operational proximity of one another.

As part of the pairing process, the MAC address of the Bluetooth™ headset 20 is made known to the mobile device 100. As such, at decision box 620, the mobile device 100 determines whether calibration data, for the audio playback path 430 between the file decoder function 310 of the mobile device 100 and the Bluetooth™ headset 20 and the video playback path 435 internally within the mobile device 100 from the file decoder function 310 to the display 110, exists for the particular Bluetooth™ headset 20 having the MAC address which was made known to the mobile device 100. If so (action 621), the media player module 183 of the mobile device 100 proceeds to play back (action 640) the multimedia file 300 in a calibrated fashion (that is, in the example embodiment described in FIG. 4, in synchronization) on the display 110 and the Bluetooth™ headset 20 as later described in greater detail in FIG. 8.

If not (action 622), the calibration module 185 of the mobile device 100 determines (action 630) the characteristics (in this example, processing delay) of the audio playback path 430, between the file decoder function 310 of the mobile device and the Bluetooth™ headset 20, relative to the video playback path 435 internally within the mobile device, between the file decoder function 310 and the display 110, by applying the multimedia playback calibration method, as later described in greater detail in FIG. 7 and then proceeds to playback (action 640) the multimedia file 300 in a calibrated fashion (that is in the example embodiment discussed in FIG. 4, in synchronization) on the display 110 and the Bluetooth™ headset 20 and as later described in greater detail in FIG. 8.

Figure 7:
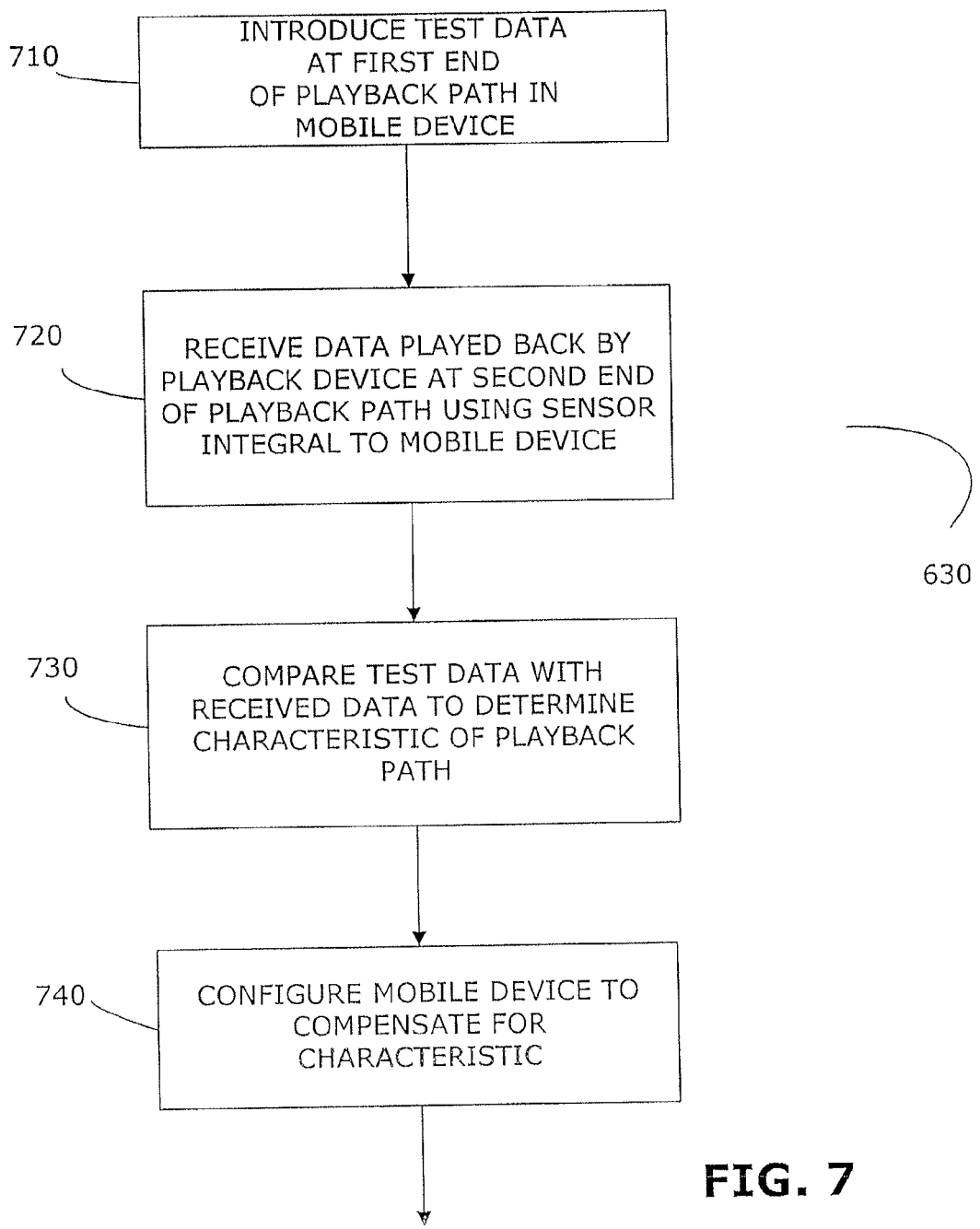
FIG. 7 is a flowchart illustrating example method actions in a multimedia playback calibration method for determining a characteristic of the playback path of FIG. 4 in accordance with an example embodiment of the present disclosure.

FIG. 7 is a flowchart illustrating example method actions in a multimedia playback calibration method for determining a characteristic of the playback path of FIG. 4 in accordance with an example embodiment of the present disclosure.

The described method actions include, at action 710, a calibration module 185 operating on the mobile device 100 to cause the mobile device 100 to introduce test data 520 at a first end 340, in the mobile device 100, of a playback path 430, 435. As discussed above, in the example embodiment described in FIG. 4, the playback path characteristic may be the processing delay imparted to the audio data stream 312 as it travels along the audio playback path 430 to the Bluetooth™ headset 20. In such an example scenario, the test data 520 may comprise a monotonically increasing frequency across the audible frequency range for a fixed period of time.

Action 720 causes the mobile device 100 to receive data 514, played back by a playback device 350, 360 at a second end 460, 465 of the playback path 430, 435, at a sensor 121 integral to the mobile device 100. As discussed above, in the example embodiment described in FIG. 4, the integral sensor 121 may be the microphone 120.

The test data 520 is fed into the audio renderer function 330 of the media player module 183 and then into the Bluetooth™ audio encoding function 441, Bluetooth™ protocol stack function 442 (or, in some example embodiments, for example where the test data 520 is encoded into the MP3 audio format and the Bluetooth™ headset 20 recognizes and handles the MP3 format, directly into the Bluetooth™ protocol stack function 442) and Bluetooth™ upconversion function 443 of the Bluetooth™ processing module 184 and out to the transmitter 147 of the Bluetooth™ communication subsystem 145 for wireless transmission by antenna element 149 through the PAN 250 to the Bluetooth™ headset 20.

This wireless signal is received by the Bluetooth™ headset 20 at its associated antenna element 420 and processed by one or more functions of the Bluetooth™ headset 20, including the Bluetoothυ baseband downconversion function 451, Bluetooth™ protocol stack function 452, Bluetooth™ audio decoder function 453, audio rendering function 454 (in some example embodiments, for example where the test data 520 is encoded into the MP3 audio format and the Bluetooth™ headset 20 recognizes and handles the MP3 format, skipping the audio decoder function 453 and the audio rendering function 454) and digital/analog processing function 455, to produce an analog signal for playback on the speaker 410. This signal is captured by the integral sensor 121, such as the microphone 120 and converted into received data 514.

The described method actions may also include positioning the mobile device 100 with the integral sensor 121 proximate to the second end 460, 465 of the playback path 430, 435. This is facilitated by the portable nature of the mobile device 100 and the sensor 121 being integrated to the mobile device 100 and obviates the use of any external cabling or connections by the calibration module 185 which may introduce delays or signal processing or degradation or combinations thereof that may impair the calibration process.

The playback path 430, 435 may be a signal path extending between a component 310 of the mobile device 100 that introduces the data 311, 312 and a component 410, 110 of the playback device 350, 360 that outputs the data 311, 312. In some example embodiments, the playback path may comprise a wireless connection between the mobile device 100 and the playback device 350, 360. Such wireless connection may be a Bluetooth™ connection or an infrared connection.

In this case of a playback device, such as display 110, being integral to the mobile device 100, the mobile device 100 can in some embodiments act as both a mobile device starting the playback of data and a playback device, and the characteristic of the playback path 435 may be determined during manufacture or resting.

Action 730 causes the mobile device 100 to compare the received data 514 against the test data 520 to determine the characteristic of the playback path 430, 435, which in the example embodiment described in FIG. 4, may be the processing delay imparted to the audio data stream 312 as it travels along the audio playback path 430 to the Bluetooth™ headset 20.

As discussed above, the received data 514 may, in some example embodiments, when received in analog form, be converted into digital form by the A/D processing function 511 of the calibration module 185 and fed into the signal detector function 512 of the calibration module 185 to identify the predetermined signal, which, as discussed above, in the example embodiment described in FIG. 4, may be a particular frequency in the midrange of the frequency range, for example, 1 kHz. When this predetermined signal is detected by the signal detector function 512, the signal detector function 512 forwards the received data 514, with the detected signal marked, to the calibration controller function 513, together with timing information, so that the time that the predetermined signal was received at the integral sensor 121 may be determined.

The calibration controller function 513 is also informed by the media player module 183 (and in particular, in the example embodiment described in FIG. 4, the audio renderer function 330 or optionally, as discussed elsewhere, the Bluetooth™ protocol stack function 442) of the time of the start of the playback of the predetermined signal in the test data 520. In some example embodiments, this may correspond to being notified of the time of the start of the playback of the test data 520 and a priori knowledge of the playback time between the start of the test data and the start of the predetermined signal.

The characteristic of the playback path 430, 435, which in the example embodiment described in FIG. 4, may be the processing delay imparted to the audio data stream 312 as it travels along the audio playback path 430 to the Bluetooth™ headset 20 as the audio playback device 360, may then be calculated. In the example embodiment described in FIG. 4, this may be determined by calculating the time difference between the start of the playback of the predetermined signal in the test data 520 and the time of receipt at the integral sensor 121 of the predetermined signal as determined by the signal detector function 512 of the calibration module 185. In some example embodiments, the processing time for the received data 514 to be processed by the A/D processing function 511, the signal detection function 512 and the calibration controller function 513 may be known a priori and deducted to further refine the processing delay imparted to the audio data stream 312.

Finally, action 740 causes the mobile device 100 to configure the mobile device 100 to compensate for this characteristic. In the example embodiment described in FIG. 4, this may comprise the calibration controller function 513 causing the video renderer function 320 to thereafter delay output of the video data stream 311 to the display 110 by a period equivalent to the processing delay imparted to the audio data stream 312.

The action 740 of configuring the mobile device 100 to compensate for this characteristic may also comprise the mobile device 100 storing user data 186 corresponding to calibration data, such as (in the case of the example embodiment described in FIG. 4) the processing delay imparted to the audio data stream 312 for the audio playback path 430 between the file decoder function 310 of the mobile device 100 and the Bluetooth™ headset 20 relative to the video playback path 435 internally within the mobile device 100 from the file decoder function 310 to the display 110. This calibration data may be stored in an erasable persistent memory, such as the flash memory 130 or a memory card 190 for later retrieval by the mobile device 100, for example when the media player module 183 of the mobile device 100 proceeds to play back (action 640) the multimedia data file 300 in a calibrated fashion (that is, in the example embodiment of FIG. 4, in synchronization) on the display 110 and the Bluetooth™ headset 20 as later described in greater detail in FIG. 8. Accordingly, the action 740 of configuring the mobile device 100 may include associating the data regarding the characteristic with the playback device 350, 360 employed in the calibration method, such as, by way of non-limiting example, by associating characteristics and/or storing them with MAC addresses of a given playback device.

Figure 8:
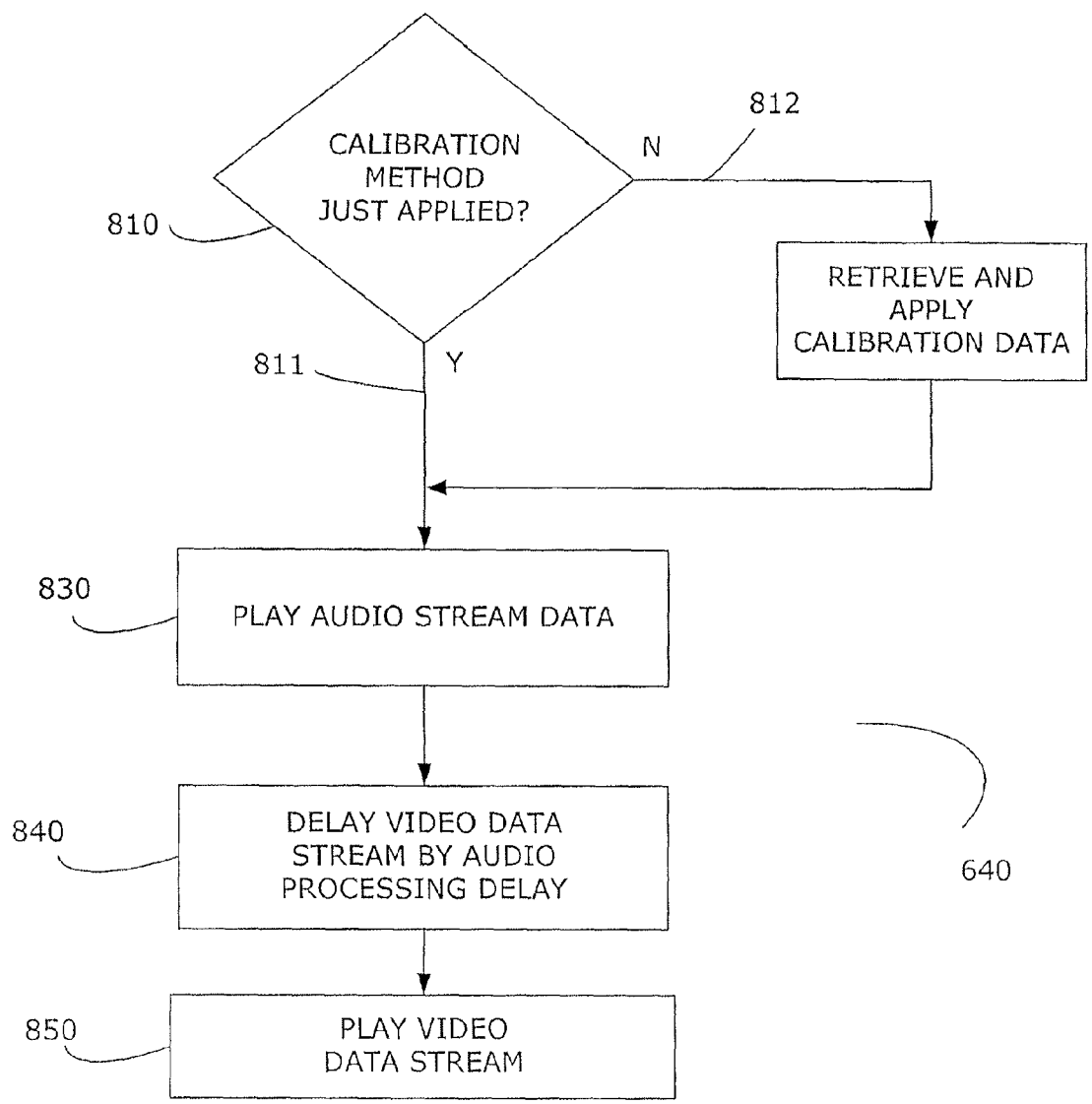
FIG. 8 is a flowchart illustrating example method actions for playing back the multimedia file in a calibrated fashion on the devices and playback path of FIG. 4, in accordance with an example embodiment of the present disclosure.

FIG. 8 is a flowchart illustrating example method actions for playing back the multimedia file in a calibrated fashion on the devices and playback path of FIG. 4, in accordance with an example embodiment of the present disclosure.

It includes, at decision box 810, the mobile device 100 determining whether the calibration method described in greater detail in FIG. 7 has just been applied. If so (action 811), processing proceeds to method action 830. If not (action 812), the mobile device 100 retrieves and applies (action 820) the calibration data. The calibration data to be retrieved may be stored as user data 186 in an erasable persistent memory, such as the flash memory 130 or a memory card 190, indexed by the MAC of the Bluetooth™ headset 20 made known to the mobile device 100 during the pairing process (action 610). The application of the calibration data may, in the example embodiment described by FIG. 4, comprise the calibration controller function 513 causing the video renderer function 320 to thereafter delay output of the video data stream 311 to the display 110 by a period equivalent to the processing delay imparted to the audio data stream 312.

The remaining actions in FIG. 8 give effect to the compensation provided by the mobile device 100 for the characteristic of the playback path described in action 740.

The action of compensating may in some example embodiments include accelerating the transmission of the data 300 from the mobile device 100 by an amount equal to a processing delay time of the playback path 435, 430. In some example embodiments, this may involve delaying transmission, from the mobile device 100, at the first end 340 of an alternative playback path 435, 430 for playback at the second end 465, 460 thereof by a second playback device 360, 350, of alternative data 312, 311 to be synchronized with the data 311, 312, by an amount equal to the processing delay of the playback path 430, 435.

Thus, as shown at action 830, the media player module 183 causes the audio data stream 312 to be sent along the audio playback path 340 in order to be played as described above.

On the other hand, as shown at action 840, the video data stream is delayed by a period equal to the processing delay imparted to the audio data stream 312 for the audio playback path 430 between the file decoder function 310 of the mobile device 100 and the Bluetooth™ headset 20 relative to the video playback path 435 internally within the mobile device 100 from the file decoder function 310 to the display 110.

Finally, after waiting this period, at action 850, the media player module 183 causes the video data stream 311 to be sent along the video playback path 435 in order to be played as described above.

In some example embodiments, the action of compensating may involve adjusting a signal spectrum of the data 311, 312 to account for a signal degradation imparted to the test data 514 along the playback path 430, 435.

With respect to the example embodiments described in FIG. 4, test calibrations were conducted according to the method and system described above with the speaker 410 of the Bluetooth™ headset 20 located approximately 2 cm from the microphone 120 of the mobile device 100. Using a mobile device 100 comprising a Blackberry™ 9300 model manufactured by Research In Motion Limited, and Bluetooth™ headset 20 comprising a Blackberry model 655+ device, sold by Research In Motion Limited, a delay of 250 ms was measured including an audio propagation delay of about 6 µs between the speaker 410 and the microphone 120. Test calibration of a Blackberry 8900 model mobile device 100 and the Blackberry 655+, headset 20 resulted in a 150 ms audio delay. Testing of a Blackberry 8350 mobile device 100 and the Blackberry 655+ headset 20 resulted in a 200 ms audio delay. Thus, significant variations in delay, which would be appreciable to human sight and sound, may be encountered with various combinations of mobile devices 100 and Bluetooth™ headsets 20.

While the present disclosure is sometimes described in terms of methods, the present disclosure may be understood to be also directed to various apparata including components for performing at least some of the aspects and features of the described methods, be it by way of hardware components, software or combinations thereof, or in any other manner. Moreover, an article of manufacture for use with the apparatus, such as a pre-recorded storage device or other similar computer-readable medium including program instructions recorded thereon or a computer data signal carrying computer readable program instructions may direct an apparatus to facilitate the practice of the described methods. Such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM) (135), a read-only memory (ROM) (140), an erasable programmable-read-only memory (EPROM) or flash memory (130), an optical disc such as a Compact Disc (CD), Digital Versatile Disc (DVD) or Blu-ray™ Disc, and a solid state storage device (190) (e.g., NAND flash or synchronous dynamic RAM (SDRAM)).

The various embodiments presented herein are merely examples and are in no way meant to limit the scope of this disclosure. Variations of the innovations described herein will become apparent from consideration of this disclosure and such variations are within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combination will become readily apparent upon review of the present disclosure as a whole. The subject matter described herein and in the recited claims intends to cover and embrace all suitable changes in the technology.

Accordingly the specification and the embodiments disclosed therein are to be considered examples only, with a true scope and spirit of the disclosure being disclosed by the following numbered claims:

What is claimed is:

1. A playback calibration method for use on an electronic device, the method comprising:
   storing a characteristic of a playback path in a memory on the electronic device;
   retrieving the characteristic from the memory; and
   configuring the electronic device to compensate for the characteristic of the playback path if the playback path is selected for playback of data by delaying transmission, from the electronic device at a first end of an alternative playback path for playback at a second end thereof by a second playback device, of alternative data to be synchronized with the data, by an amount equal to a processing delay of the playback path.

2. The method according to claim 1, further comprising determining the characteristic by introducing test data at a first end of the playback path and comparing data received at a second end of the playback path against the test data relative to an alternate playback path.

3. The method according to claim 1, wherein the storing comprises associating the characteristic with the playback path.

4. The method according to claim 1, wherein the characteristic is a feature selected from a group consisting of a processing delay time of the playback path and a signal degradation imparted to the test data along the playback path.

5. The method according to claim 1, wherein configuring the electronic device further comprises compensating for the characteristic of the playback path when transmitting data from the electronic device at the first end of the playback path for playback at the second end thereof.

6. The method according to claim 1, wherein configuring the electronic device further comprises accelerating the transmission of the data from the electronic device over the playback path by an amount equal to a processing delay time of the playback path.

7. The method according to claim 1 wherein configuring the electronic device further comprises adjusting a signal spectrum of the data to account for a signal degradation along the playback path.

8. A electronic device comprising:
a memory having a characteristic of a playback path stored thereon;
a multimedia player for initiating playback of at least one data stream on a playback device over the playback path; and
a central processing unit configured to retrieve the characteristic from the memory and configure the electronic device to compensate for the characteristic if the playback path is selected for playback of data by delaying transmission, from the electronic device at a first end of an alternative playback path for playback at a second end thereof by a second playback device, of alternative data to be synchronized with the data, by an amount equal to a processing delay of the playback path.

9. The electronic device of claim 8, further comprising:
a sensor for receiving data played back by the playback device at a second end of the playback path; and
a calibration module for introducing test data at a first end of the playback path and comparing data received at a second end of the playback path against the test data to determine the characteristic of the playback path relative to an alternate second path.

10. The electronic device according to claim 9, wherein the calibration module comprises a signal detector to identify a particular signal in the received data relevant to the characteristic of the playback path.

11. The electronic device according to claim 9, wherein the calibration module comprises an analog to digital converter to convert the received data into digital form.

12. The electronic device according to claim 9, wherein the characteristic is a feature selected from a group consisting of a processing delay time of the playback path and a signal degradation imparted to the test data along the playback path.

13. The electronic device according to claim 8, wherein the characteristic is a processing delay time of the playback path and the central processing unit is further configured to cause the electronic device to accelerate the transmission of data over the playback path by an amount equal to a processing delay time.

14. The electronic device according to claim 8, wherein the central processing unit causes the electronic device to compensate for the characteristic by adjusting a signal spectrum of the data to account for a signal degradation along the playback path.

15. The electronic device according to claim 8 comprising the playback device.

16. A non-transitory computer readable medium having computer-executable instructions stored thereon that, when executed by a central processing unit of an electronic device, cause the electronic device to:
store a characteristic of a playback path in a memory on the electronic device;
retrieve the characteristic from the memory; and
configure the electronic device to compensate for the characteristic of the playback path if the playback path is selected for playback of data by delaying transmission, from the electronic device at a first end of an alternative playback path for playback at a second end thereof by a second playback device, of alternative data to be synchronized with the data, by an amount equal to a processing delay of the playback path.

17. The computer readable medium according to claim 16, wherein the instructions further cause the electronic device to determine the characteristic by introducing test data at a first end of the playback path and comparing data received at a second end of the playback path against the test data relative to an alternate playback path.

* * * * *